(12) United States Patent
Schuetz

(10) Patent No.: US 11,274,960 B2
(45) Date of Patent: Mar. 15, 2022

(54) CALIBRATION AND SUPPORT PLATFORM FOR CALIBRATION WEIGHTS ON A CONVEYOR AND METERING DEVICE

(71) Applicant: SCHENCK PROCESS EUROPE GMBH, Darmstadt (DE)

(72) Inventor: Andreas Schuetz, Bischofsheim (DE)

(73) Assignee: Schenck Process Europe GmbH, Darmstadt (DE)

( * ) Notice: Subject to any disclaimer, the term of this patent is extended or adjusted under 35 U.S.C. 154(b) by 239 days.

(21) Appl. No.: 16/662,879

(22) Filed: Oct. 24, 2019

(65) Prior Publication Data

US 2020/0056931 A1 Feb. 20, 2020

Related U.S. Application Data

(63) Continuation of application No. PCT/EP2018/060457, filed on Apr. 24, 2018.

(30) Foreign Application Priority Data

Apr. 25, 2017 (DE) ..................... 10 2017 003 966.6

(51) Int. Cl.
*G01G 23/01* (2006.01)
*G01G 11/00* (2006.01)
*G01G 11/04* (2006.01)

(52) U.S. Cl.
CPC ........... *G01G 23/01* (2013.01); *G01G 11/003* (2013.01); *G01G 11/006* (2013.01); *G01G 11/04* (2013.01)

(58) Field of Classification Search
CPC .... G01G 23/01; G01G 11/003; G01G 11/006; G01G 11/04; B65G 39/12

(Continued)

(56) References Cited

U.S. PATENT DOCUMENTS 3,193,082 A * 7/1965 Crane .................... G01G 15/00
177/145
3,773,124 A * 11/1973 Bullivant ................. G01G 3/10
177/21 OR (Continued)

FOREIGN PATENT DOCUMENTS

AU 631695 12/1992
CN 102103006 A * 6/2011 ........... G01G 23/012

(Continued)

OTHER PUBLICATIONS

Translation RU-2401994-C1 (Year: 2006).*

*Primary Examiner* — Alexander A Mercado
*Assistant Examiner* — Monica S Young
(74) *Attorney, Agent, or Firm* — Muncy, Geissler, Olds & Lowe, P.C.

(57) ABSTRACT

A conveyor and metering device having a continuous conveyor belt or conveyor band, sub-regions of this conveyor belt or conveyor band being mounted on weighing devices for determining the mass of the conveyed material, which are connected to an electronic evaluation device, the weighing devices generating a signal proportional to the load of the conveyor belt or conveyor band and transmitting it to the evaluation device, weighing devices are provided, each of which includes a bearing bracket, which is used to receive an attachment in a form-filling manner from the outside, preferably from above, through an opening in the frame of the conveyor and metering device during the operation of the conveyor.

11 Claims, 4 Drawing Sheets

(58) Field of Classification Search
USPC .......................................... 73/1.13; 177/119
See application file for complete search history.

(56) References Cited

U.S. PATENT DOCUMENTS

| | | | |
|---|---|---|---|
| 3,976,150 A | | 8/1976 | Wilson et al. |
| 4,480,705 A | * | 11/1984 | Raske .................... G01G 23/01 |
| | | | 177/1 |
| 5,296,654 A | * | 3/1994 | Farley .................... G01G 11/04 |
| | | | 177/119 |
| 6,267,661 B1 | * | 7/2001 | Melville .............. A22B 5/0064 |
| | | | 452/157 |
| 6,818,841 B1 | * | 11/2004 | McDonald ........... G01G 11/006 |
| | | | 177/119 |
| 2002/0020350 A1 | * | 2/2002 | Prentice ............. H05K 13/0469 |
| | | | 118/669 |
| 2007/0074560 A1 | | 4/2007 | Dietrich |

FOREIGN PATENT DOCUMENTS

| | | | | |
|---|---|---|---|---|
| CN | 202710149 U | * | 1/2013 | |
| CN | 107337171 A | * | 11/2017 | |
| CN | 211425640 U | * | 9/2020 | |
| GB | 1 557 207 | | 12/1979 | |
| GB | 1557207 A | * | 12/1979 | ........... G01G 11/046 |
| GB | 2128345 A | * | 4/1984 | ............ G01G 11/04 |
| RU | 90552 U1 | * | 1/2010 | |
| RU | 2401994 C1 | * | 10/2010 | |

\* cited by examiner

CALIBRATION AND SUPPORT PLATFORM FOR CALIBRATION WEIGHTS ON A CONVEYOR AND METERING DEVICE

This nonprovisional application is a continuation of International Application No. PCT/EP2018/060457, which was filed on Apr. 24, 2018, and which claims priority to German Patent Application No. 10 2017 003 966.6, which was filed in Germany on Apr. 25, 2017, and which are both herein incorporated by reference.

BACKGROUND OF THE INVENTION

Field of the Invention

The present invention relates to conveyor and metering device.

Description of the Background Art

Conveyor and metering devices include, among other things, belt conveyors in the form of belt weighers or metering belt weighers, which are provided to continuously weigh bulk material transported on a conveyor belt. These belt weighers and metering belt weighers have a continuous conveyor belt, which is set in motion by a drive and is mounted in sub-regions on rollers and idler rollers. An idler roller is usually supported by a weighing device in the form of a force transducer, a load cell or another load detecting assembly to supply a gross weight signal for a known belt section of the belt length, which indicates the weight of the material. The gross weight signal proportional to the load, which is generated by the conveyed materials on the conveyor belt, is then further processed in a weighing electronic system.

Belt load Q and velocity v are measured continuously and multiplied by each other. The result is the rate of conveyance, from which the conveying capacity is ascertained To ensure the functioning of the conveyor and metering device, the weighing devices must be tared and/or calibrated at regular intervals.

This necessity arises mainly from temperature fluctuations in the surrounding area of the conveyor and metering device as well as from the wear and decreasing strength of the conveyor belt or conveyor. A calibration of the conveyor and metering device is also customary when changing the conveyed material.

When a belt weigher is tared, the tare weight of the conveyor belt acting upon the weighing device is ascertained during one belt revolution, and the corresponding parameter is stored in the weighing electronics. After taring, the mean value of the belt load is correspondingly set over a belt revolution equal to zero, so that only the belt load, without the weight of the conveyor belt, is ascertainable when ascertaining the rate of conveyance.

During the calibration, however, errors in the mechanical system of the conveyor or unsecured data of the mechanical system, such as leverage or belt inclination, may be detected. For this purpose, the weigher is checked, based on test weights, such as commercial weights.

The test weights are suspended on the existing weighing device for this purpose, for example with the aid of a lug, a wire, a rod or another suspension structure. The ratio between the setpoint weight and test weight measured value is then ascertained via a calibration program. In the case of an ideal weigher, this ratio should be 1.0000.

The attachment of test weights to the weighing device, however, is extremely complex and time-intensive, particularly in the case of enclosed conveyor and metering devices, since the accessibility of the weighing device is made more difficult by attachments, such as geared motors or switch boxes, etc. on the frame.

A holder for a cylindrical test weight is known from US 2007/0074560 A1, in which the test weight is disposed below the conveyor rollers of the conveyor belt. The test weight is positioned on a tray below the conveyor rollers during regular conveyor operation but is simultaneously disposed within two loops at both ends, which are connected to the load cells to be calibrated. For the calibration operation, the two loops are tightened with the aid of an actuator disposed for this purpose, so that the test weight whose load acts upon the load cells is lifted, and the load cells and the associated controller may be calibrated.

This approach requires an increased amount of structural complexity and is also cost-intensive, due to the actuator, which is additionally required.

Other known approaches provide for stationary holders on the conveyor and metering devices, which are provided for receiving the test weights. However, they are also permanently present and usually project laterally beyond or over the frame. Due to dirt contamination, touching or wind loads, the detection of the weight signal may therefore be changed or corrupted, which may consequently result in a malfunction of the conveyor apparatus.

SUMMARY OF THE INVENTION

It is therefore an object of the present invention to easily introduce test forces of test weights into the weighing devices of conveyor and metering devices for the purpose of permitting the calibration operation to be carried out as quickly and safety as possible.

A conveyor and metering device is provided that comprises a continuous conveyor belt, sub-regions of this conveyor belt being mounted on weighing devices for ascertaining the mass of the conveyed material, which are connected to an electronic evaluation device. The weighing devices generate a signal proportional to the load of the conveyor belt and transmit it to the evaluation device.

The weighing devices also include a bearing bracket, which is provided to receive an attachment, a holding device and/or a test weight in a form-fitting manner. The bearing bracket is usually used only to fasten the force transducer to the weighing device or to the frame structure of the conveyor and metering device. It is also used to introduce the load of the weight loads from the weighing roller into the force transducer. The approach according to the invention now provides an additional connection geometry on the bearing bracket for the attachment or test weight. The corresponding attachment or test weight may be fastened thereby to the bearing bracket in a form-fitting manner. The conveyor and metering device according to the invention also comprises a frame or a substructure, which is provided with an opening in the region of and/or above the bearing brackets, so that the attachment or the test weight may be mounted on the bearing bracket through the opening from the outside, preferably from above. According to the invention, the fastening of the attachment, the positioning of the test weight and the withdrawal or removal of the test weight and the attachment may take place during the conveyor operation of the conveyor and metering device.

The bearing brackets can have a protruding extension. This protruding extension of the bearing bracket, in turn, has a recess on its end facing away from the bearing bracket, i.e. the protruding end.

The bearing bracket of the weighing device advantageously also has a fork bearing for a shaft journal of a weighing roller, on which the conveyor belt of the conveyor and metering device is mounted at least in sub-regions.

An attachment for a conveyor and metering device is also provided. This attachment can have a support region for a separate test weight and a connecting region with a journal, which is provided for the form-fitting connection to the bearing bracket, the extension of the bearing bracket and/or the recess on the extension of the bearing bracket. This attachment may be stored in a suitable and accessible location in the frame or the substructure of the conveyor and metering device. When it is needed for the calibration, it may then be mounted on the bearing bracket from the outside through an opening in the frame, preferably from above.

The journal advantageously can have a forked shape, a cylindrical shape or a stepped cylindrical shape in the connecting region of the attachment.

The attachment, or also the holder for the test weight(s), thus makes it possible to introduce a known weight force of a test weight or test force into the weighing device. For this purpose, the attachment is provided with a connection geometry which corresponds to the geometry on the weighing device, so that a form-fitting connection between the weighing device and the attachment or holder may be established.

The geometry of the two elements, the weighing device and the attachment, makes a direct introduction of force into the weighing device possible without additional force transmitting elements, such as springs or levers. Thus, there is also no risk of corrupting the weighing results due to friction or changed lever conditions.

The geometry of the bearing bracket and that of the attachment are furthermore matched to each other in such a way that the attachment may be mounted on the bearing bracket without getting stuck and without tilting.

The support region of the attachment also has a flat support surface, which is suitable for using test weights in the form of commercial weights or other components having a predetermined weight, for example also tools or the like.

The conveyor and metering device advantageously has a holder or receptacle for the attachment on its frame, so that the latter may be stored in the region of the weighing device in a captive and easily accessible manner.

In addition, a method for calibrating a conveyor and metering device is provided, in which a known test weight is placed on a weighing device of the conveyor and metering device for the purpose of comparing a weight signal generated by the placement of the test weight with a stored signal corresponding to the test weight. An attachment is fastened to the weighing device in a form-fitting manner for the placement of the test weight. To do this, a journal of the attachment is inserted into the connection geometry of the weighing device provided for this purpose.

The method according to the invention also provides that the attachment is inserted from above through an opening in the frame of the conveyor and metering device.

For this purpose, the journal of the attachment need only be inserted through the opening of the frame. Due to the connection geometry of the attachment and weighing device, these elements are subsequently connected to each other in a form-fitting manner without corrupting the measurement result due to clamping forces or force shunt.

The method also provides that the opening in the frame of the conveyor and metering device is protected against the penetration of bulk material or dirt after the removal of the test weight and the attachment by inserting a closure.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
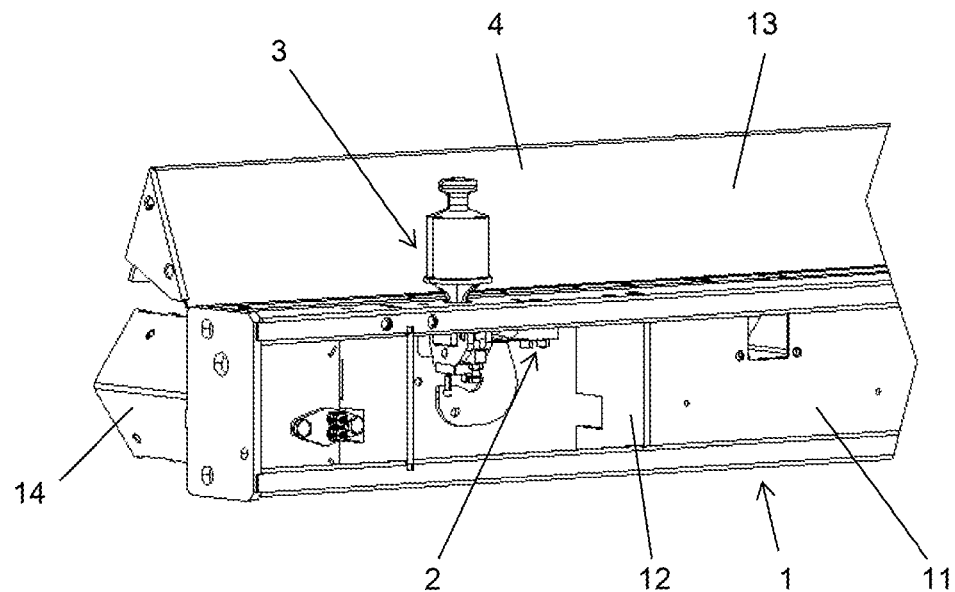
FIG. 1 shows a perspective view of part of a conveyor and metering device according to the invention in the form of a metering belt weigher with a mounted attachment and test weight.

The figures are of a schematic nature and are used exclusively for the sake of understanding the invention. Identical elements are provided with identical reference numerals.

Figure 2:
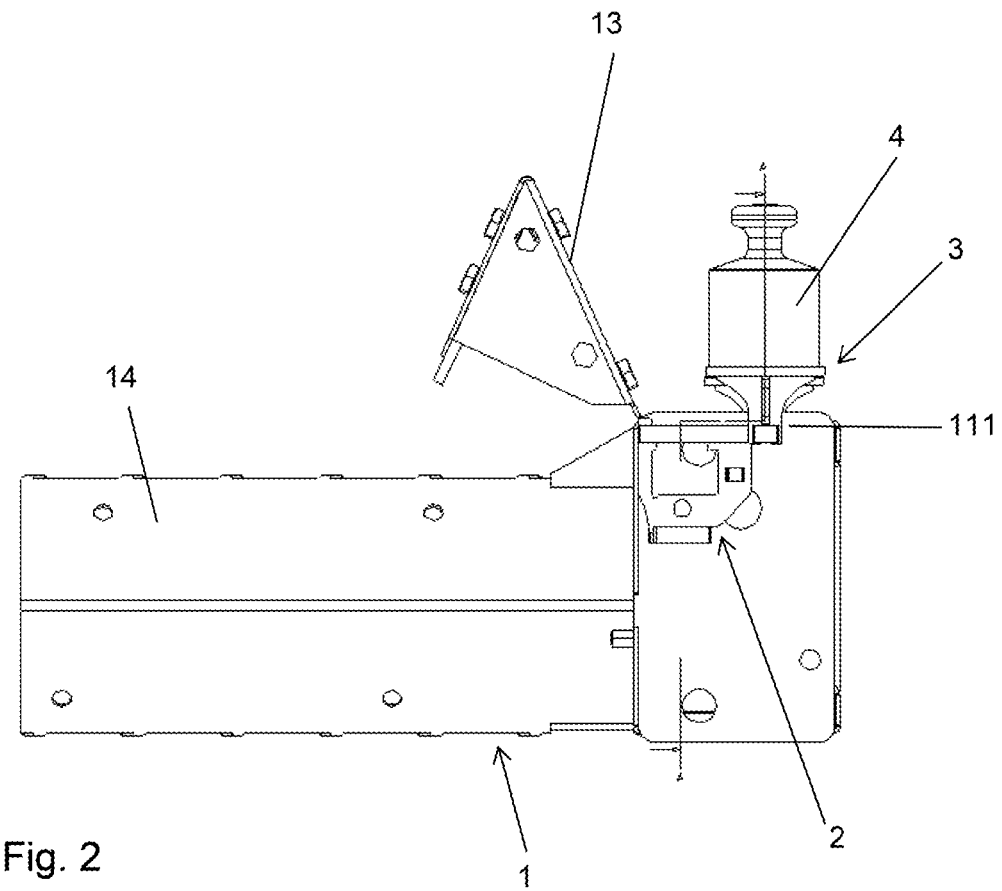
FIG. 2 shows a side view of the part of the conveyor and metering device according to the invention from FIG. 1.
Figure 3:
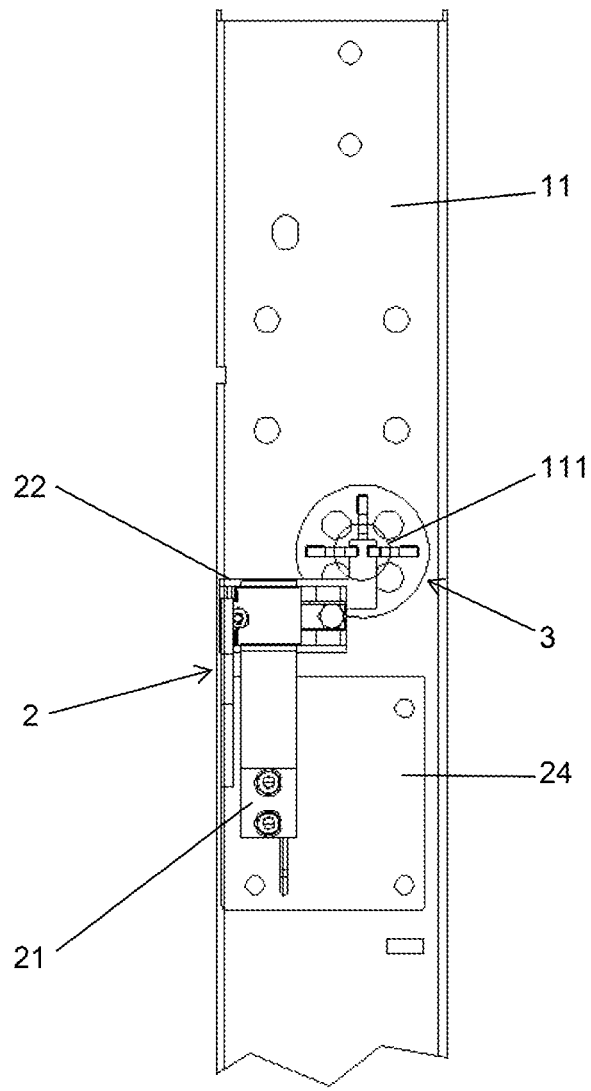
FIG. 3 shows a bottom view of the part of the conveyor and metering device according to the invention from FIG. 1.
Figure 4:
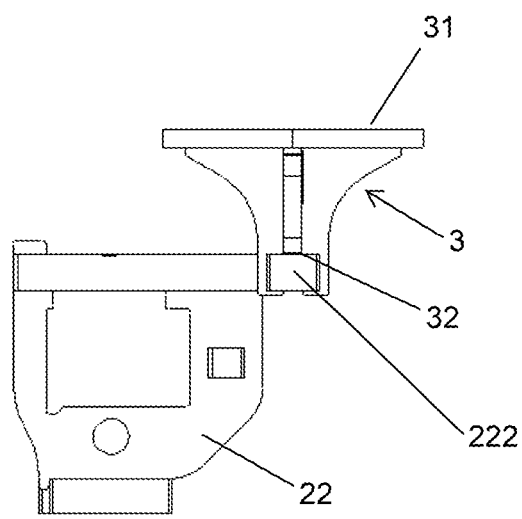
FIG. 4 shows a side view of a bearing bracket of the weighing device with the mounted attachment.

FIG. 1, FIG. 2 and FIG. 3 show part of a metering belt weigher, including a substructure 1 made from a steel sheet, on which a continuous conveyor belt is disposed, which passes around a driving and deflection roller.

The conveyor belt, on which bulk material rests during operation, is usually moved between two material guide strips 13. A weighing device 2 is fastened to a frame bracket 11, which is reinforced by metal sheets 12 and transverse struts 14. According to the invention, an attachment 3 is fastened to weighing device 2 and connected thereto in a form-fitting manner. Attachment 3 has a flat bearing surface 31, on which a test weight 4 may be loosely positioned.

Weighing device 2, which is also referred to as a compact weighing part, is fastened to frame bracket 11 with the aid of a mounting plate 24. A force transducer 21, in turn, is glued to mounting plate 24. A bearing bracket 22, in turn, surrounds force transducer 21 in a form-fitting manner, so that the latter is mounted there in a fork bearing.

Figure 6:
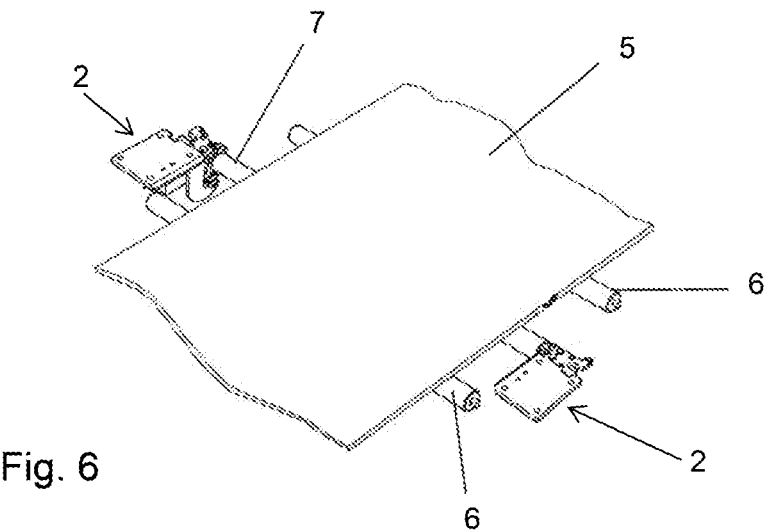
FIG. 6 shows a perspective view of part of a conveyor belt, which rests on idler rollers and a measuring roller.
Figure 7:
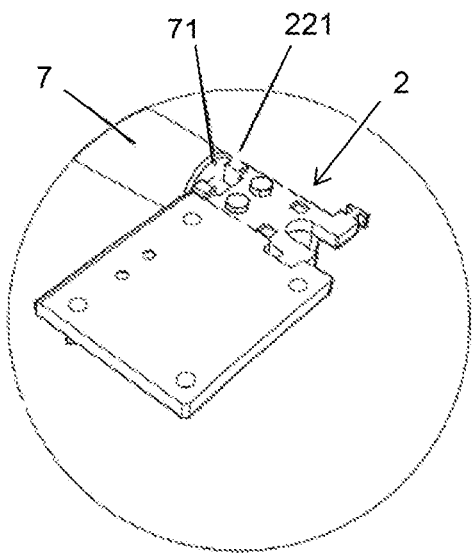
FIG. 7 shows a detail from FIG. 6, including the support situation of the measuring roller on a weighing device.

FIG. 6 shows part of a conveyor belt 5, which forms the so-called weighing bridge. Continuous conveyor belt 5 rests on two idler rollers 6 and on one measuring roller 7 in this region. As is apparent from FIG. 7, measuring roller 7, in turn, rests with its two axle journals 71 in recesses 221 of bearing bracket 22 of weighing device 2 provided for this purpose. The region of conveyor belt 5, which is supported on measuring roller 7, including the conveyed material, is detected and weighed by weighing devices 2 during the operation of the conveyor and metering device. Recess 221 on bearing bracket 22 forms the measured load introduction point.

Figure 5:
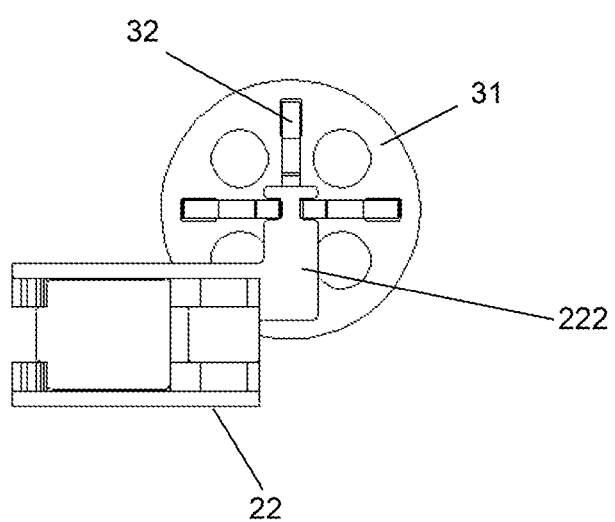
FIG. 5 shows a bottom view of the bearing bracket of the weighing device with the mounted attachment from FIG. 4.
Figure 8:
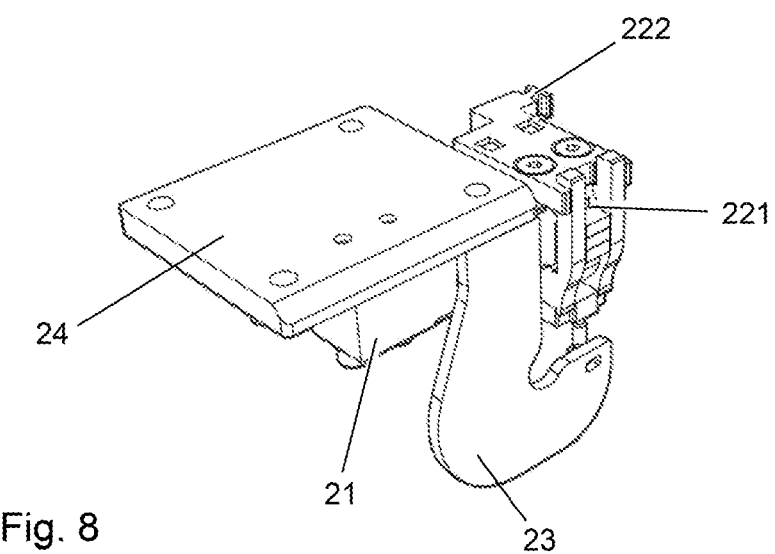
FIG. 8 shows a weighing device in a perspective representation.

According to the invention, bearing bracket 22, as is apparent from FIGS. 5 and 8, is additionally provided with a protruding extension 222, which makes it possible to fasten attachment 3 to weighing device 2. It may be advantageously cost-effectively manufactured during the cutting out of the metal sheet components of bearing bracket 22, for example in a laser cutting machine.

The forked geometry of journal 32 of attachment 3 is particularly advantageous, since attachment 3 may be held thereby on bearing bracket 22 or extension 222 of the bearing bracket in a tilt-proof manner.

Existing conveyor and metering devices may also be retrofitted later on with weighing devices 2 according to the invention. For this purpose, openings 111 for passing through attachments 3 or test weights 4 must only be created later on in the frame or substructure 1 of the conveyor and metering device. The complexity associated therewith, however, is more than justified by the time savings in subsequent calibration operations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A conveyor and metering device comprising:
   a continuous conveyor belt, sub-regions of the conveyor belt being mounted on weighing devices to ascertain a mass of conveyed material, which are connected to an electronic evaluation device;
   a bearing bracket attached to at least one of the weighing devices; and
   an attachment that is attachable to and detachable from the bearing bracket during operation of the conveyor belt of the conveyor and metering device, the attachment being inserted through an opening in a lateral frame or a lateral substructure of the conveyor and metering device to be attached to the bearing bracket,
   wherein the attachment, when attached to the bearing bracket, allows placement of a test weight thereon for calibration during the operation of the conveyor and metering device,
   wherein the bearing bracket is adapted to receive a journal of the attachment in a form-fitting manner during the operation of the conveyor and metering device, and
   wherein the bearing bracket and the attachment, when the attachment is attached to the bearing bracket, are positioned adjacent to a lateral outer side of the conveyor belt, such that the bearing bracket and the attachment are positioned laterally outside of a running path of the conveyor belt.

2. The conveyor and metering device according to claim 1, wherein the bearing bracket has a protruding extension on which the journal of the attachment is received.

3. The conveyor and metering device according to claim 2, wherein the protruding extension of the bearing bracket has a recess in which the journal of the attachment is inserted.

4. The conveyor and metering device according to claim 1, further comprising a weighing roller having a shaft journal, wherein the bearing bracket of the weighing device has a fork bearing that receives and supports the shaft journal of the weighing roller, and wherein the conveyor belt of the conveyor and metering device is mounted on the weighing roller at least in the sub-regions.

5. An attachment for a conveyor and metering device according to claim 1, the attachment comprising:
   a support region for the test weight; and
   a connecting region with the journal, which is provided for the form-fitting connection to the bearing bracket.

6. The attachment for a conveyor and metering device according to claim 5, wherein the journal has a forked shape, a cylindrical shape or a stepped cylindrical shape in the connecting region.

7. The attachment for a conveyor and metering device according to claim 5, wherein the bearing bracket has a protruding extension on which the journal of the attachment is received for the form-fitting connection.

8. The attachment for a conveyor and metering device according to claim 7, wherein the protruding extension of the bearing bracket has a recess in which the journal of the attachment is inserted.

9. A method for calibrating a conveyor and metering device, the method comprising:
   placing a test weight on a weighing device of the conveyor and metering device to compare a weight signal generated by the placement of the test weight with a stored signal corresponding to the test weight; and
   fastening an attachment to a bearing bracket of the weighing device in a form-fitting manner by inserting a journal of the attachment through an opening in a lateral frame of the conveyor and metering device and into a connecting geometry of the bearing bracket during an operation of the conveyor and metering device, the attachment, when fastened to the bearing bracket and during operation of the conveyor and metering device, allows placement of the test weight thereon to compare the weight signal of the test weight with the stored signal of the test weight,
   wherein the attachment is fastenable to and detachable from the bearing bracket during operation of a conveyor belt of the conveyor and metering device, and
   wherein the bearing bracket and the attachment, when the attachment is attached to the bearing bracket, are positioned adjacent to a lateral outer side of the conveyor belt, such that the bearing bracket and the attachment are positioned laterally outside of a running path of the conveyor belt.

10. The method according to claim 9, wherein the test weight is positioned on a support of the attachment.

11. The method according to claim 9, wherein the opening in the frame is protected against a penetration of bulk material or dirt after a removal of the test weight and the attachment by inserting a closure.

* * * * *